US008194920B2

(12) United States Patent
Ebenstein et al.

(10) Patent No.: US 8,194,920 B2
(45) Date of Patent: Jun. 5, 2012

(54) METHOD AND SYSTEM FOR DETECTING OBJECTS USING FAR INFRARED IMAGES

(75) Inventors: Samuel Ebenstein, Southfield, MI (US); Gregory Smith, Ann Arbor, MI (US); Kwaku Prakah-Asante, Commerce Township, MI (US); Yelena Rodin, Southfield, MI (US); Nicholas Zorka, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 935 days.

(21) Appl. No.: 11/675,799

(22) Filed: Feb. 16, 2007

(65) Prior Publication Data

US 2008/0197284 A1    Aug. 21, 2008

(51) Int. Cl.
*G06K 9/00* (2006.01)
*G06K 9/34* (2006.01)
*G06K 9/46* (2006.01)
*G06K 9/38* (2006.01)

(52) U.S. Cl. ........ 382/103; 382/100; 382/104; 382/173; 382/190; 382/270

(58) Field of Classification Search .......... None
See application file for complete search history.

(56) References Cited

U.S. PATENT DOCUMENTS

| | | | | |
|---|---|---|---|---|
| 4,859,852 A * | 8/1989 | Genna et al. | ............... | 250/363.1 |
| 6,670,910 B2 * | 12/2003 | Delcheccolo et al. | .......... | 342/70 |
| 6,728,334 B1 * | 4/2004 | Zhao | ............... | 378/62 |
| 6,759,949 B2 * | 7/2004 | Miyahara | ............... | 340/435 |
| 6,815,680 B2 * | 11/2004 | Kormos | ............... | 250/330 |
| 6,956,469 B2 * | 10/2005 | Hirvonen et al. | ............ | 340/435 |
| 7,024,292 B2 * | 4/2006 | Remillard et al. | ............ | 701/36 |
| 7,574,031 B2 * | 8/2009 | Dehmeshki | ............... | 382/131 |
| 7,646,902 B2 * | 1/2010 | Chan et al. | ............... | 382/128 |
| 2003/0053674 A1 * | 3/2003 | Armato et al. | ............... | 382/132 |
| 2003/0218676 A1 * | 11/2003 | Miyahara | ............... | 348/148 |
| 2004/0146917 A1 * | 7/2004 | Cork et al. | ............... | 435/6 |
| 2004/0228529 A1 * | 11/2004 | Jerebko et al. | ............... | 382/173 |
| 2004/0252870 A1 * | 12/2004 | Reeves et al. | ............... | 382/128 |

(Continued)

OTHER PUBLICATIONS

A. Broggi et al., "A Multi-Resolution Approach for Infrared Vision-Base Pedestrian Detection", 2004 IEEE Intelligent Vehicles Symposium, University of Parma, Parma, Italy, Jun. 14-17, 2004, pp. 7-12.

*Primary Examiner* — Jingge Wu
*Assistant Examiner* — Avinash J Yentrapati
(74) *Attorney, Agent, or Firm* — Frank A. MacKenzie; Brooks Kushman P.C.

(57) ABSTRACT

An object detection system is disclosed in at least one embodiment. The system includes a far IR sensor operable to sense thermal radiation of objects and surroundings in a field of view and to generate a far IR image in response thereto, and an image processing device operable to receive and process the far IR image to detect the presence of one or more objects in the field of view. The image processing device can be configured to process the far IR image by generating an initial threshold image based on the far IR image and an initial threshold value, iteratively obtaining a number of successive threshold images based on the far IR image and a number of successively increased threshold values, and determining the presence of one or more objects in the field of view based on the threshold images and threshold values.

22 Claims, 11 Drawing Sheets

U.S. PATENT DOCUMENTS

| | | | |
|---|---|---|---|
| 2005/0110621 A1* | 5/2005 | Hahn et al. | 340/435 |
| 2005/0111757 A1* | 5/2005 | Brackett et al. | 382/294 |
| 2005/0157929 A1* | 7/2005 | Ogasawara | 382/181 |
| 2005/0231339 A1* | 10/2005 | Kudo | 340/435 |
| 2005/0240411 A1* | 10/2005 | Yacoub | 704/270 |
| 2005/0276447 A1 | 12/2005 | Taniguchi et al. | |
| 2006/0083428 A1* | 4/2006 | Ghosh et al. | 382/224 |
| 2006/0147101 A1* | 7/2006 | Zhang et al. | 382/131 |
| 2006/0177125 A1* | 8/2006 | Chan et al. | 382/154 |
| 2006/0181678 A1* | 8/2006 | Stark et al. | 351/206 |
| 2006/0206243 A1* | 9/2006 | Pawlicki et al. | 701/1 |
| 2007/0007436 A1* | 1/2007 | Maksymowicz | 250/208.2 |
| 2007/0081712 A1* | 4/2007 | Huang et al. | 382/128 |
| 2007/0148665 A1* | 6/2007 | Cork et al. | 435/6 |
| 2008/0002887 A1* | 1/2008 | Revow | 382/187 |
| 2008/0170763 A1* | 7/2008 | Begelman et al. | 382/128 |
| 2009/0153659 A1* | 6/2009 | Landwehr et al. | 348/135 |

\* cited by examiner

US 8,194,920 B2

METHOD AND SYSTEM FOR DETECTING OBJECTS USING FAR INFRARED IMAGES

BACKGROUND

1. Technical Field

One aspect of the present invention generally relates to a method and system for detecting objects, such as pedestrians and animals, using far infrared images.

2. Background Art

Many pedestrian detection systems have been proposed to mitigate pedestrian injuries resulting from the operation of vehicles. The typical pedestrian detection system includes one or more sensors mounted to the front of the vehicle for sensing conditions relating to the space in front of the vehicle to obtain data, which is transmitted to an onboard image processing unit. The image processing unit processes the collected data to detect whether a pedestrian occupies the space in front of the vehicle. If a pedestrian is detected, then the processing unit sends a signal to a vehicle warning system to alert the driver so that measures can be taken to avoid contact between the vehicle and the pedestrian. Moreover, the signal can be transmitted to an autonomous braking system to trigger autonomous braking of the vehicle.

SUMMARY

One aspect of the present invention generally relates to a method and system for detecting targets, such as pedestrians or animals, using far infrared (IR) images generated from a far IR camera. In certain embodiments, the far IR camera collects thermal energy data related to the temperature of sensed objects and surroundings that can be converted into a far IR image. Pedestrians and other targets have a detectible footprint in the far IR image. Pedestrians are usually warmer than their surroundings, thereby providing the highly detectible footprint. Conversely, if the pedestrian is cooler than their surroundings, which may occur in desert areas, a highly detectible footprint is still generated.

In at least one embodiment, a relatively low resolution far IR camera is utilized. The use of a low resolution far IR camera with the methodology of certain embodiments of this invention provides a relatively low cost solution for detecting targets. According to one application, the low resolution far IR camera can be mounted to the front end of a vehicle so that the IR camera, in combination with a detection system, can be utilized to detect pedestrians occupying the space in front of the vehicle and in the far IR camera's field of view.

An object detection system is disclosed in at least one embodiment. The system includes a far IR sensor operable to sense thermal radiation of objects and surroundings in a field of view and to generate a far IR image in response thereto, and an image processing device operable to receive and process the far IR image to detect the presence of one or more objects in the field of view. The image processing device can be configured to process the far IR image by generating an initial threshold image based on the far IR image and an initial threshold value, iteratively obtaining a number of successive threshold images based on the far IR image and a number of successively increased threshold values, and determining the presence of one or more objects in the field of view based on the initial threshold image and the number of successive threshold images.

BRIEF DESCRIPTION OF THE DRAWINGS

The features of one or more embodiments of the present invention which are believed to be novel are set forth with particularity in the appended claims. One or more embodiments of the present invention, both as to its organization and manner of operation, together with further objects and advantages thereof, may best be understood with reference to the following description, taken in connection with the accompanying drawings which:

DETAILED DESCRIPTION OF EMBODIMENTS

Figure 1:
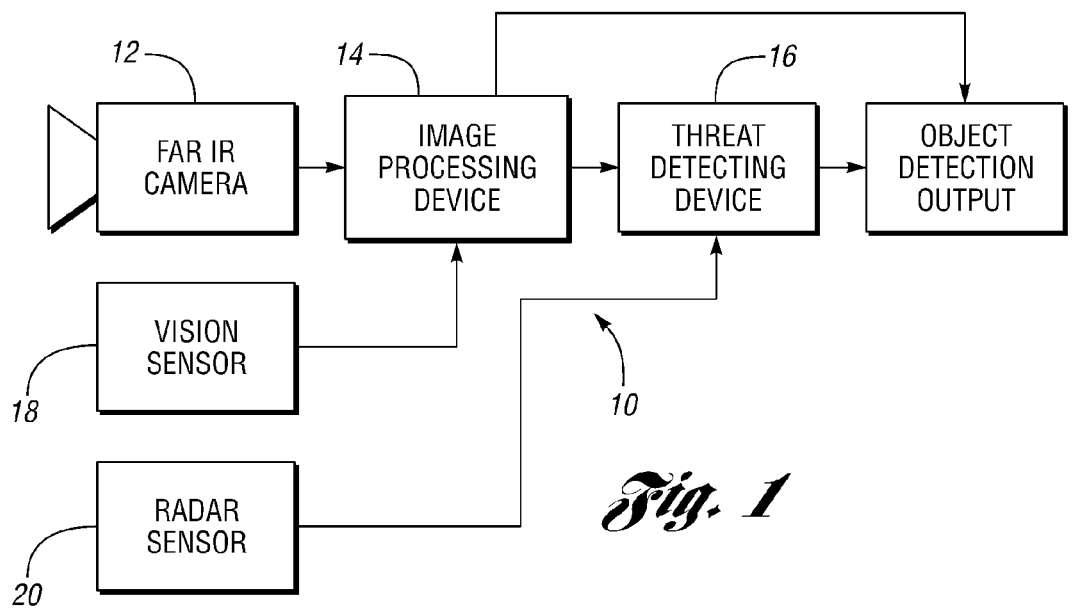
FIG. 1 is a block diagram of a detection system according to one embodiment of the present invention.
Figure 2:
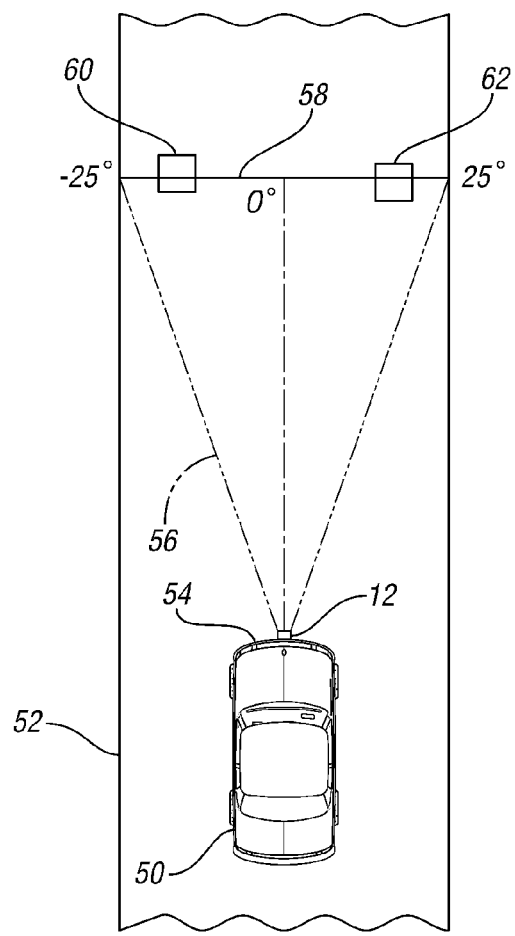
FIG. 2 is a schematic, top view of a vehicle according to one embodiment of the present invention.

Turning to the drawings, FIGS. 1 and 2 are described concurrently. FIG. 1 is a block diagram of a detection system 10 and FIG. 2 is a schematic, top view of a vehicle 50 disposed on a road 52, which is depicted as having one lane, however multiple lanes are contemplated by one or more embodiments of the present invention. The detection system 10 includes a far infrared (IR) camera 12, which can be disposed at the front end 54 of vehicle 50 to detect objects, such as targets, and surroundings disposed in front of the far IR camera 12. Targets can be defined as objects that occupy space in front of the vehicle and are detectable by the detection system. Non-limiting examples of targets include pedestrians and animals.

It should be appreciated that the far IR camera 12 can be disposed at other positions on the vehicle, such as a lateral side of the vehicle or the vehicle rear end, according to different implementations of the present invention.

The far IR camera 12 senses thermal radiation of objects and/or surroundings in the field of view 56 within the detection plane 58 and generates an image relating to the temperature of the sensed objects and/or surroundings. As depicted in FIG. 2, objects 60 and 62 in the field of view 56 and detection plane 58 are detectible by the far IR camera 12. The field of view 56 of the far IR camera 12 is 50 degrees, ranging from −25 degrees to 25 degrees, as depicted in FIG. 2. The field of view can vary depending on the implementation of the present invention provided that the field is wide enough so that the image obtained from the far IR camera can be utilized to detect objects. In at least one embodiment, the field of view range is between 30 and 90 degrees.

In at least one embodiment, the far IR camera is capable of sensing thermal radiation in the 5-12 micron wavelength band and generating an image related to the temperature of sensed objects and/or surroundings. Far IR cameras suitable for use with one or more embodiments of the present invention are available from FLIR Systems, Indigo Operations, of Santa Barbara, Calif. It should be appreciated that other IR cameras can be utilized in accordance with one or more embodiments of the present invention.

The far IR camera correlates thermal energy emitted from an area in the field of view 56 within a cell of the detection plane 58. Each cell can be represented by a width dimension (x) and a height dimension (y). The radiation sensed at any point in the detection plane 60 can be represented by $P_{x,y}$. Therefore, the data gathered by the far IR camera 12 includes a two-dimensional array of pixels, identified by a spatial coordinate ($P_{x,y}$) corresponding to the image sensed by the far IR camera 12.

In at least one embodiment, the image generated by the far IR camera 12 is a gray scale image consisting of a two-dimensional array of gray scale pixels. The lowest level of thermal radiation, that is the relatively coldest temperature, can be represented by a gray scale value of 0 (black), while the highest level of thermal radiation, that is the warmest temperature, can be represented by a gray scale value of 255 (white). The relationship of the gray scale value and the temperature may vary depending on the application, but often a linear or logarithmic scale relationship is utilized.

The image dimensions can vary depending upon implementation of the present invention. The far IR camera may have a 320 x pixel dimension by a 240 y pixel dimension, i.e. a 320×240 resolution camera. In certain embodiments, an 80×60 resolution camera can be utilized in combination with the image processing device 14 to detect objects. In some applications, an 80×60 resolution camera, or lower resolution, is preferred because of the relatively low cost of the camera, coupled with the capability of the methods of one or more embodiments of the present invention to utilize a low resolution camera to detect objects. In yet other embodiments, the dimensions of the image can be selected from an x dimension of 60, 80, 160, 240 and 320 and the y dimension of 20, 60, 80, 120 and 240.

The detection system 10 also includes an image processing device 14 configured to receive the image signal transmitted by the IR camera 12. The image processing device 14 is also configured to detect one or more objects, for example, targets, in the image.

The image processing device 14 can generate object detection output, including, but not limited to, the identification and/or position of one or more objects of thermal interest, and/or the identification and position of one or more targets. In at least one embodiment, the detection output can be transmitted to other modules in a vehicle computer system to trigger a visual and/or audio warning alerting the driver to the presence of one or more targets in the space in front the vehicle.

In at least one embodiment, the detection system 10 also includes a vision sensor 18 and/or a radar sensor 20. The vision sensor 18 can be configured to obtain data using a vision technology that can be utilized to detect the presence of one or more objects. The data output by the vision sensor 18 can be transmitted to the image processing device 14 for detecting one or more objects using one or more pattern matching techniques. The radar sensor 20 can be configured to transmit a signal that is returned by reflecting off of an object. The radar sensor 20 can collect the return signal. The data relating to the transmitted and return signals can be transmitted to a threat detecting device 16 for detecting the presence of an object and for determining the distance between the radar sensor and the object. The threat detecting device 16 can generate object detection output, as depicted in FIG. 1.

Figure 3:
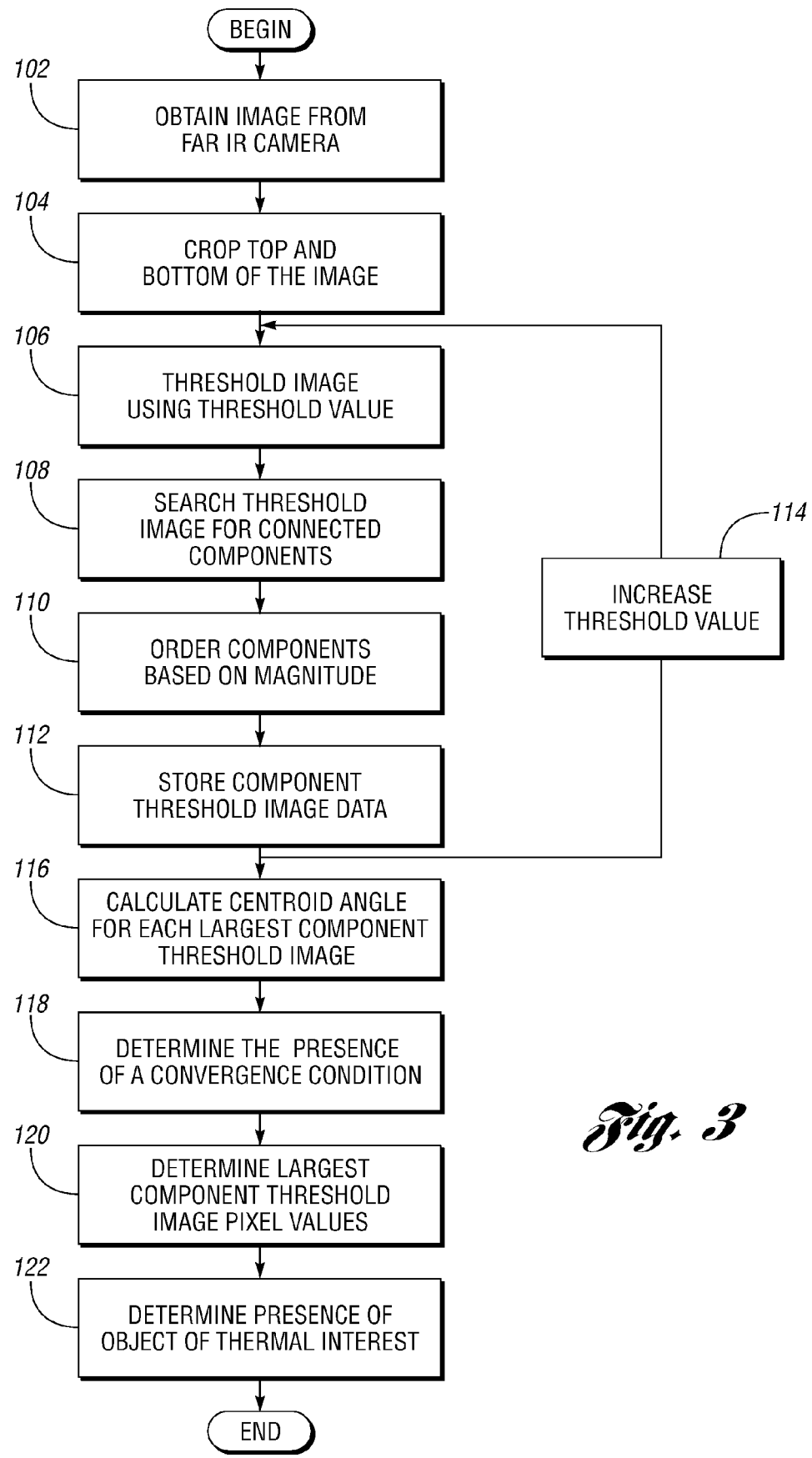
FIG. 3 is a flowchart of a method implementing a detection system according to one embodiment of the present invention.
Figures 4, 5:
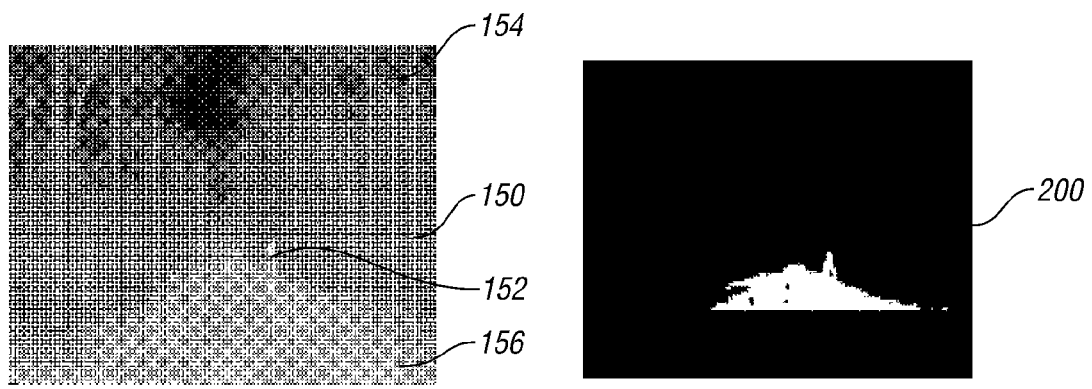
FIG. 4 depicts a far IR image according to one embodiment of the present invention.
FIG. 5 depicts a threshold image according to one embodiment of the present invention.

FIG. 3 depicts a flowchart 100 of a method implementing detection system 10 according to one embodiment of the present invention. In block 102, a far IR image is obtained using a far IR camera. The far IR image can be in the form of a gray scale image 150, as depicted in FIG. 4. Gray scale image 150 includes a pedestrian 152 positioned approximately 20 meters from the far IR camera. A 320×240 far IR camera was utilized to generate the gray scale image 150, which has dimensions of 320×240 pixels.

In block 104 of flowchart 100, the top and bottom of the image 150 is cropped. A top region of the image 150 can be cropped to eliminate a portion of the image 150 that represents the sky 154. A bottom region 156 of the image 150 can be cropped to eliminate a portion of the image 150 that may be obscured by the vehicle hood line. In at least one embodiment, the top 79 rows of the 320 rows of pixels are discarded and the bottom 51 rows of the 320 rows are discarded. The range of discarded top rows can be from 60 to 100, while the range of discarded bottom rows can be from 40 to 60, depending on the implementation of the present invention.

In block 106, the image 150 is thresholded using a threshold value. The gray scale value of each image pixel is compared to the threshold value to obtain a threshold pixel for each image pixel. If the gray scale value of the image pixel is greater than or equal to the threshold value, then the gray scale value of the threshold pixel is set to the maximum value of 1. If the gray scale value of the image pixel is less than the threshold value, then the gray scale value of the threshold pixel is set to the minimum value of 0.

FIG. 5 depicts a threshold image 200 based on image 150 using a threshold value of 160. Therefore, each pixel of image 150 that has a gray scale value of 160 or greater is set to 1 (white) and each pixel of image 150 that has a gray scale value of less than 160 is set to 0 (black).

In block 108, the threshold image 200 is searched for one or more connected components. According to the connected components processing technique, if a white pixel has a neighbor pixel that is white, then than the two pixels are connected. Using this technique, all the pixels that are connected to each other can be connected to obtain connected components. While the image 150 is two-dimensional, the image 150 can be embedded in three-dimensional space for purposes of convenience. Pixels in the same component are given the same z value. Black is assigned the value 0 and the connected components are assigned increasing integer values of z starting with the value of 1 for the first component that is located. In at least one embodiment, the connected components are located by searching the upper left hand corner of the image to the lower right hand corner of the image.

Figure 6:
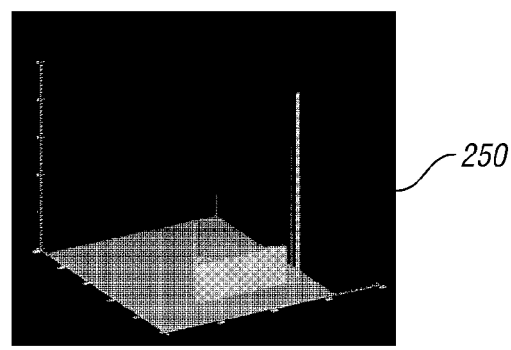
FIG. 6 depicts a three-dimensional representation of the components located in the threshold image depicted in FIG. 5.

FIG. 6 depicts a three-dimensional representation 250 of the components located in threshold image 200. The three-dimensional representation 250 includes six values, i.e. 0 through 5, where value 0 represents the background value and the values 1-5 represent five components.

In block 110, the connected components are ordered by magnitude, i.e. the number of points in each of the connected components. Table 1 contains the magnitude of each value in three-dimensional representation 250.

TABLE 1

| Value | Magnitude |
|-------|-----------|
| 0 | 8014 |
| 1 | 3229 |
| 2 | 9 |
| 3 | 1 |
| 4 | 1 |
| 5 | 10 |

Figures 7, 8A:
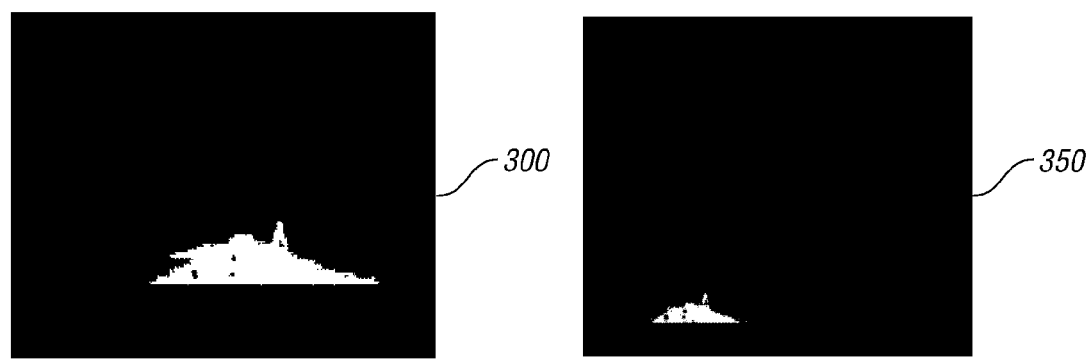
FIG. 7 depicts a largest component threshold image according to one embodiment of the present invention.
FIGS. 8a, 8b, 8c, 8d, 8e, 8f and 8g depict a series of successive threshold images according to an embodiment of the present invention.
Figure 8B:
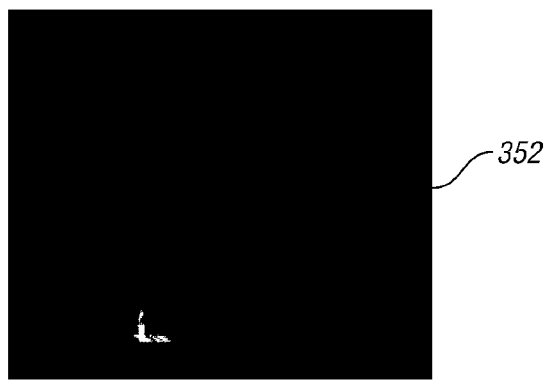
Figure 8C:
Figure 8D:
Figure 8E:
Figure 8F:
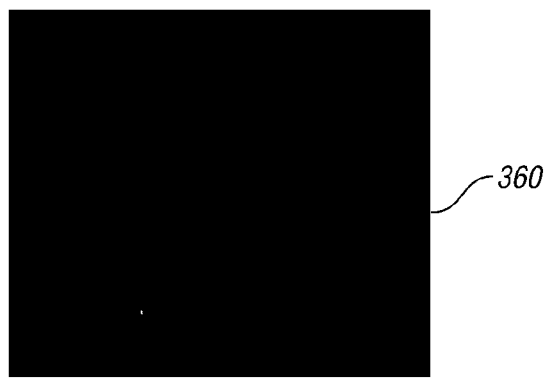
Figure 8G:
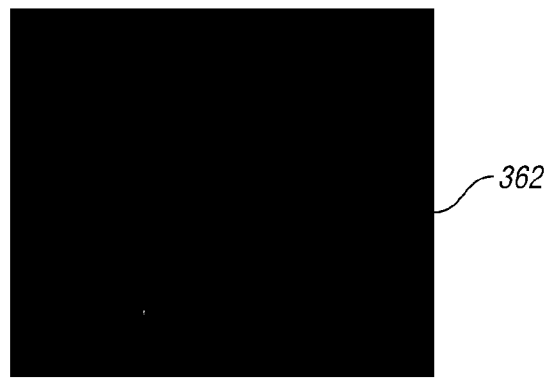

The component having the value 1 has the largest magnitude, i.e. 3229. In at least one embodiment, the component having the largest magnitude represents an area of thermal interest, i.e. an area in which the temperature differential and the surrounding background is relatively large. FIG. 7 depicts a component threshold image 300 of the component having the largest magnitude.

In block 112, the data of the component threshold image 300 is stored for later use in determining the presence of an object. The data can be stored in a database (not shown) of the detection system 10.

The steps represented in blocks 106, 108, 110 and 112 are repeated one or more times using successively increasing threshold values, as depicted in block 114. These steps are otherwise referred to as the repeated increasing threshold steps.

FIGS. 8a, 8b, 8c, 8d, 8e, 8f, and 8g depict examples of a series of largest component threshold images 350, 352, 354, 356, 358, 360 and 362, respectively, utilizing threshold values 170, 180, 190, 200, 210, 220, and 240, respectively. While the threshold value was incremented 10 for most iterations of the repeated increasing threshold steps, it should be appreciated that the threshold value increment can be varied depending on the implementation of the present invention. In certain embodiments, the threshold increment value can be in the range of 1 to 20, and in other embodiments, the threshold increment value can be in the range of 1 to 10.

Figure 9:
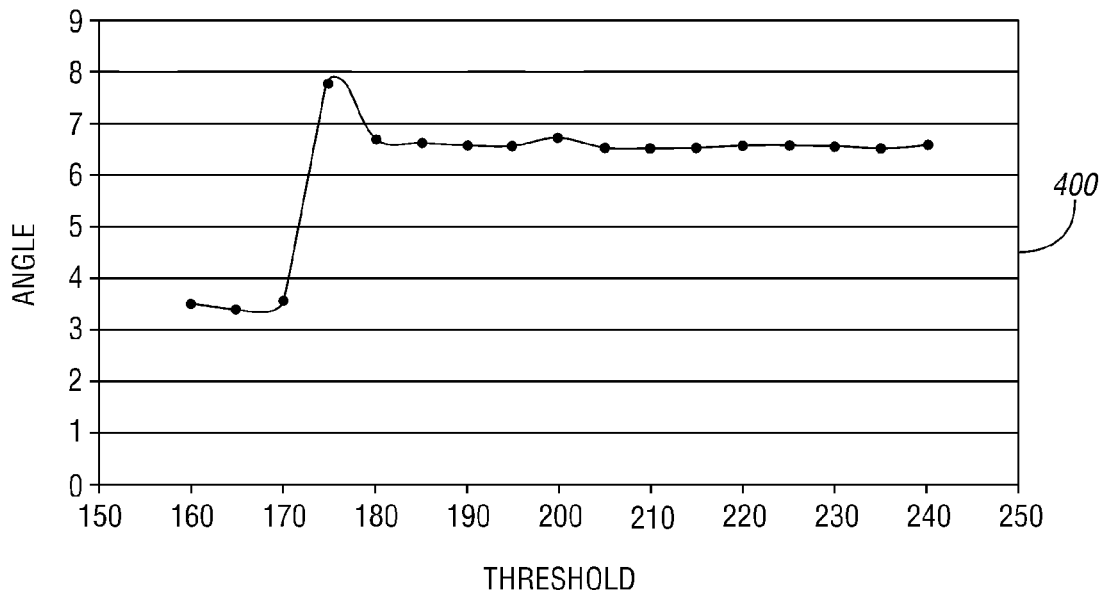
FIG. 9 depicts a graph plotting centroid angles versus threshold values according to an embodiment of the present invention.

In block 116, the centroid angle for each largest component threshold image is calculated for each threshold value. The cetroid value can be computed as a two-dimensional pixel value $C_{x,y}$ using a method known to one skilled in the art. The x value of $C_{x,y}$ can be converted into an angle value within the field of view. If the field of view is 50 degrees and the x dimension (width) of the image is 320, then x=0 pixels corresponds to −25 degrees and x=319 pixels corresponds to 25 degrees. Using these field of view and x dimension values, the field of view degree is calculated as −25+(x/319)*50. In more general terms, the cetroid angle can calculated using the following equation:

$$A = B + (x/C)*D \qquad (1)$$

where
A=centroid angle
B=negative boundary of the field of view
x=x pixel of the centroid
C=pixel width of the image
D=total degrees of the field of view In block 118, it is determined whether a convergence condition is met by the centroid angle for each largest component threshold image as a function of threshold value. FIG. 9 depicts a graph 400 plotting the centroid angle for each largest component threshold image versus the threshold value. As depicted in FIG. 9, the centroid angle converges to a position of 6.5 degrees at a threshold value of 180.

In at least one embodiment, the following algorithm is utilized to determine convergence. Each successive centroid is based on a different successive threshold value as defined above. $(x_1, y_1)$ represents the x and y coordinates of a first centroid and $(x_2, y_2)$ represents the x and y coordinates of a successive second centroid. p1 represents the number of points in the first centroid and p2 represents the number of points in a successive centroid. The distance (d) between the first centroid and the second successive centroid is defined as:

$$d = SQRT((144*(x_1-x_2)*(x_1-x_2)) + 25*(y_1-y_2)*(y_1-y_2)/(5*p2)) \qquad (2)$$

In at least one embodiment, if the distance is less than 1.2 between the first centroid and the successive second centroid (otherwise referred to as adjacent centroids), then the adjacent centroids are considered close. In other embodiments, if the distance is less than 1.5, then the adjacent centroids are considered close. In yet other embodiments, if the distance is less than 1.0, then the adjacent centroids are considered close.

In at least one embodiment, the convergence condition is met if at least three adjacent close centroids are identified.

Figure 10:
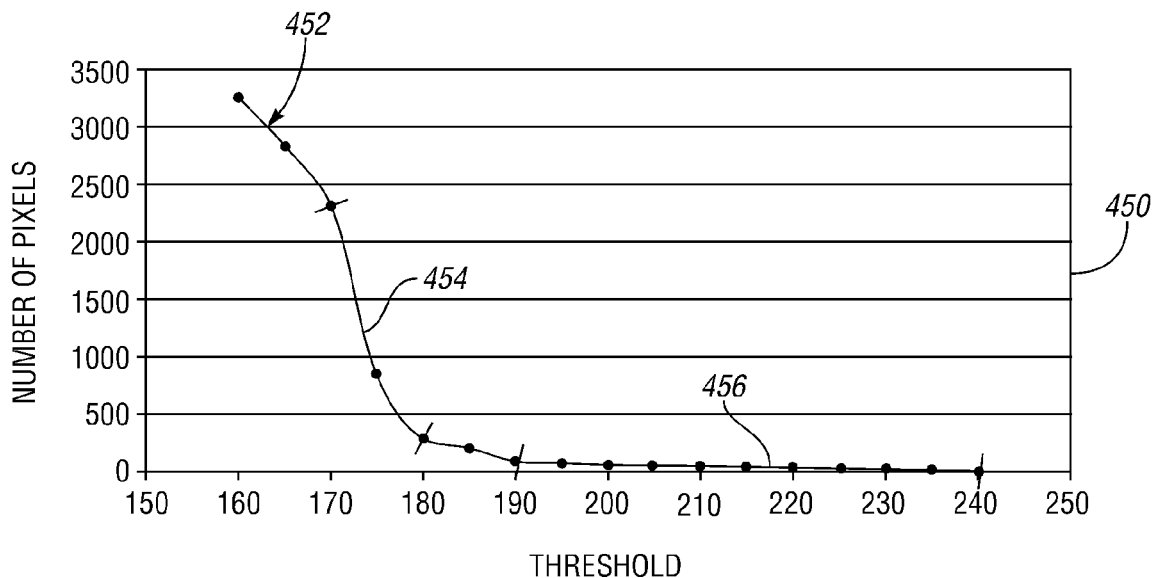
FIG. 10 depicts a graph plotting largest component threshold image pixel values versus threshold values according to an embodiment of the present invention.

In block 120, the number of pixels in each of the largest component threshold images is compared to the threshold value. FIG. 10 depicts a graph 450 plotting the number of pixels in each of the largest component threshold images compared to the threshold value. The resulting curve 452 includes a portion 454 having a relatively steep negative slope, followed by a portion 456 having a relative no slope, i.e. portion 456 remains relatively constant. The portion 454 is positioned between threshold values of 160 to 190, while the constant portion 456 is positioned between 190 and 240. In at least one embodiment, the constant portion can be defined as a portion of the curve that has a slope within +/−0.2, and in other embodiments, the constant portion of the curve may have a slope within +/−0.1.

In block 122, the presence of an object of thermal interest is determined based the results of steps 118 and 120. In at least one embodiment, if a centroid angle convergence is identified through step 118 between thresholds bounded by first and second threshold values and curve 452 includes a constant portion 456 within a substantial portion of the threshold boundary, e.g. at least 80% (in other embodiments at least 70%), then an object of thermal interest exists. With respect to FIGS. 9 and 10, both of these conditions are met, and the angle of convergence is 6.5 degrees, as depicted in FIG. 9, and the threshold boundaries are 180-240.

The method 100 set forth in FIG. 3 can be applied to a single image or multiple images. In at least one embodiment, method 100 is repeated with multiple frames in order to determine whether the object of thermal interest is a target, such as an animal or pedestrian. In at least one embodiment, the far IR camera is configured to capture 30 frames per second. In at least one embodiment, at least 2-3 successive frames are subjected to the method 100. If the one or more objects of thermal interest are identified in all of the successive frames considered, then the one or more objects of thermal interest are considered one or more targets. In certain embodiments, the results of method 100 and information obtained from a vision sensor can be used in combination to detect the presence of one or more targets.

Figure 11:
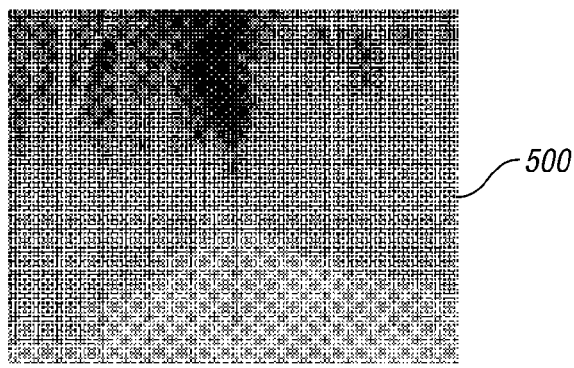
FIG. 11 depicts a far IR image according to one embodiment of the present invention.
Figure 12A:
FIGS. 12a, 12b, 12c, 12d, 12e, 12f, 12g, and 12h depict a series of successive threshold images according to an embodiment of the present invention.
Figure 12B:
Figure 12C:
Figure 12D:
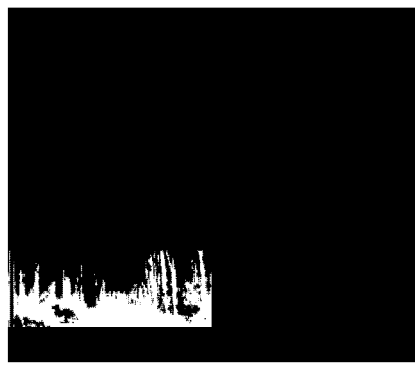
Figure 12E:
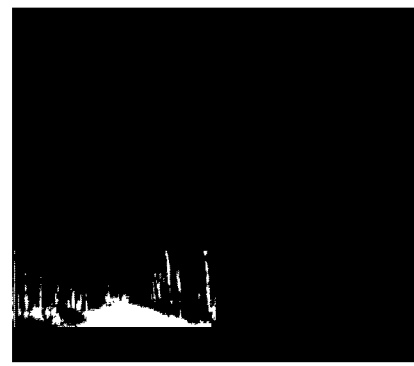
Figure 12F:
Figure 12G:
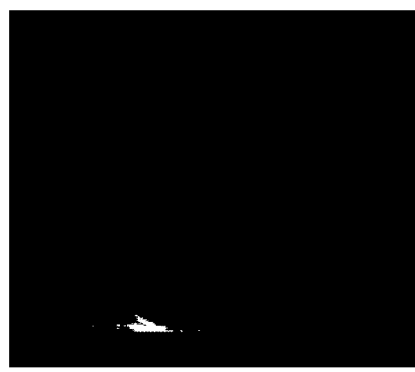
Figure 12H:
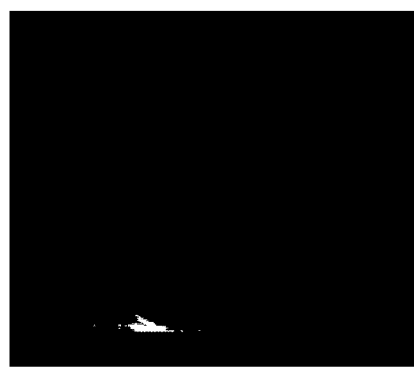

FIGS. 11-14 depict an example of applying the method 100 to an image 500 that does not include one or more targets. FIG. 11 depicts a gray scale image 500 without one or more targets. A 320×240 far IR camera was utilized to generate the gray scale image 500, which has dimensions of 320×240 pixels (block 102). The top (79 rows) and bottom (51 rows) of gray scale image 500 were cropped (block 104). The gray scale image 500 was thresholded to obtain a number of threshold images based on threshold values of 160, 170, 180, 190, 200, 210, 220 and 240, as described above with respect to block 106. Each threshold image was subjected to steps 108, 110 and 112 of FIG. 3, to obtain a number of largest component threshold images. Largest component threshold images 550, 552, 554, 556, 558, 560, 562 and 564 for threshold values of 160, 170, 180, 190, 200, 210, 220 and 240, respectively, are depicted in FIGS. 12a, 12b, 12c, 12d, 12e, 12f, 12g and 12h, respectively.

Figure 13:
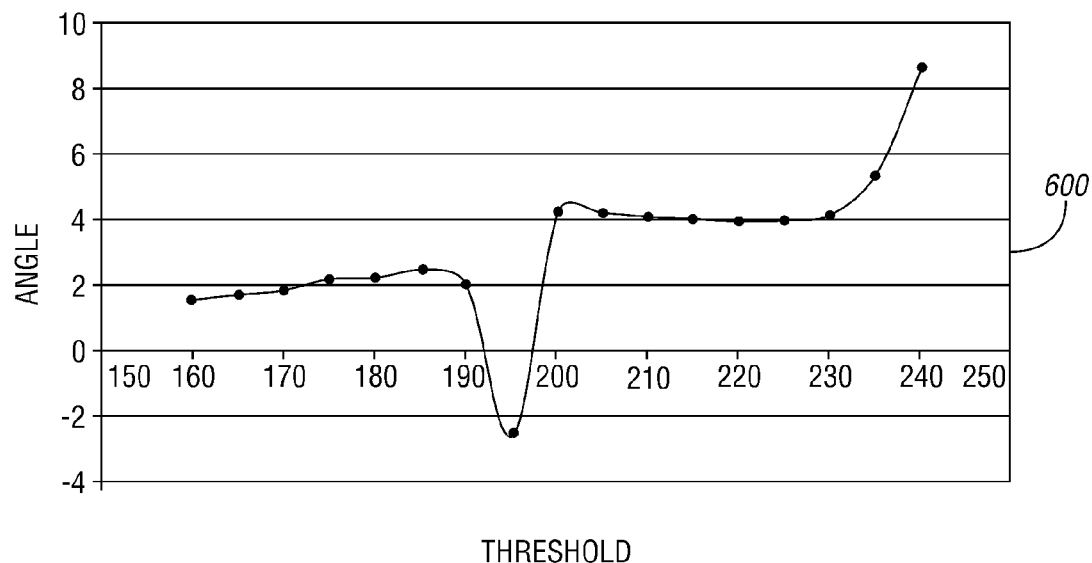
FIG. 13 depicts a graph plotting centroid angles versus threshold values according to an embodiment of the present invention.

The centroid angle of each largest component threshold image is calculated using the description set forth above for block 116. FIG. 13 depicts a graph 600 plotting the centroid angle for each largest component threshold image versus the threshold value based on image 500. As shown in FIG. 13, the centroid angle does not converge to a single value, i.e. the centroid angle curve drastically increases in slope at the higher end of the threshold values.

Figure 14:
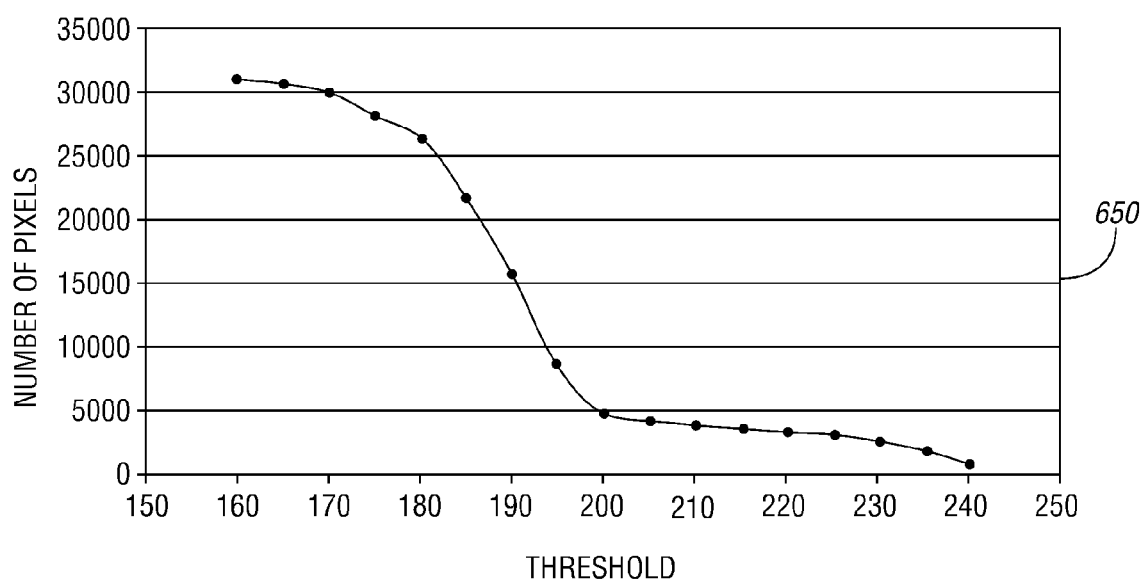
FIG. 14 depicts a graph plotting largest component threshold image pixel values versus threshold values according to an embodiment of the present invention.
Figure 15:
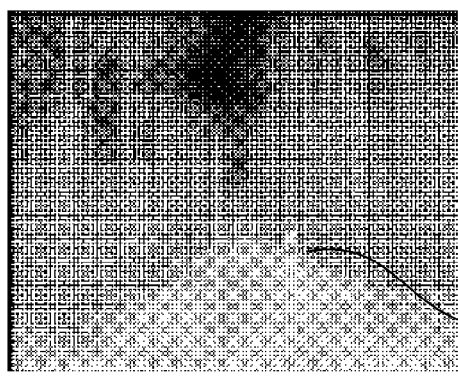
FIG. 15 depicts a far IR image according to one embodiment of the present invention.
Figure 16A:
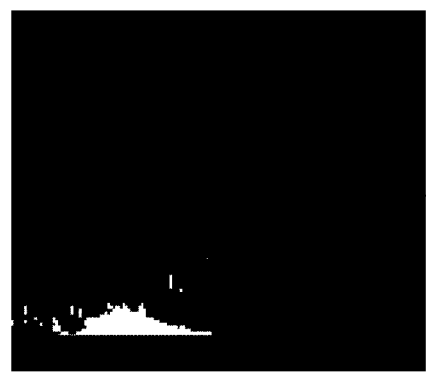
FIGS. 16a, 16b, 16c, 16d, 16e, 16f, 16g, and 16h depict a series of successive threshold images according to an embodiment of the present invention.
Figure 16B:
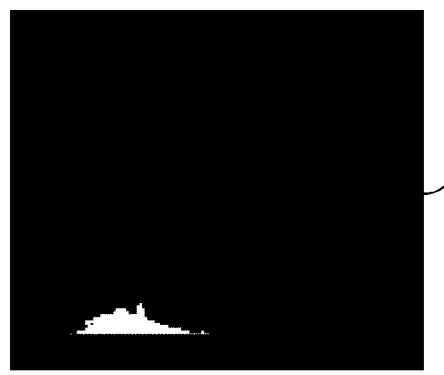
Figure 16C:
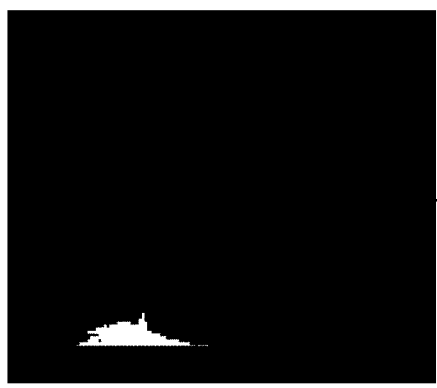
Figure 16D:
Figure 16E:
Figure 16F:
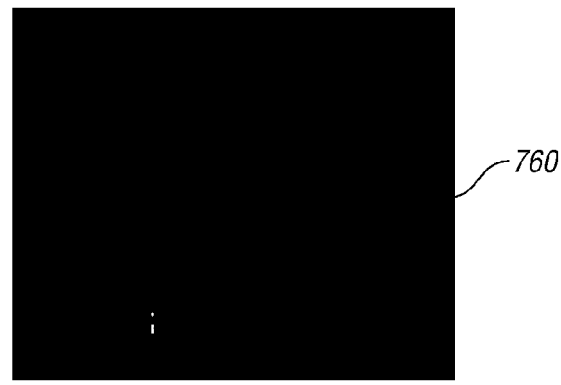
Figure 16G:
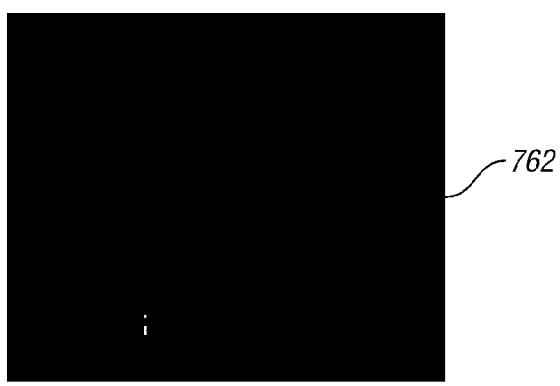
Figure 16H:
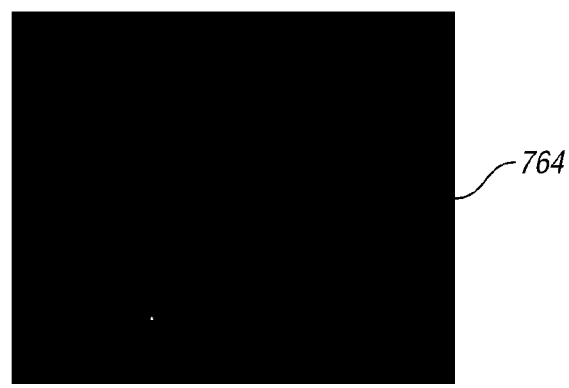

The number of pixels in each of the largest component threshold images is compared to the threshold value using the description set forth above for block 118. FIG. 14 depicts a graph 650 plotting the number of pixels in each of the largest component threshold images is compared to the threshold value based on image 500.

Table 2 compares the data for image 150 (with a pedestrian) to image 500 (without a pedestrian). Column heading 160, 180 and 200 represent the pixel count of the largest component threshold image for threshold values of 160, 180 and 200.

TABLE 2

| Image | 160 | 180 | 200 | % Decrease 160 to 180 | % Decrease 160 to 200 |
|---|---|---|---|---|---|
| 500 | 31000 | 26000 | 5000 | 16 | 84 |
| 150 | 3200 | 300 | 35 | 90 | 99 |

FIGS. 15-18 depict an example of applying the method 100 to an image 700 having dimensions of 80×60. The image 700 was generated by processing an image from a 320×240 far IR camera to simulate an image captured by a 80×60 far IR camera. It should be appreciated that the image can also be generated directly from a 80×60 far IR camera. The image 700 includes a pedestrian 702 positioned approximately 20 meters from the far IR camera.

The top (20 rows) and bottom (16 rows) of gray scale image 700 were cropped (block 104). The gray scale image 700 was thresholded to obtain a number of threshold images based on threshold values of 160, 170, 180, 190, 200, 210, 220 and 240, as described above with respect to block 106. Each threshold image was subjected to steps 108, 110 and 112 of FIG. 3, to obtain a number of largest component threshold images. Largest component threshold images 750, 752, 754, 756, 758, 760, 762 and 764 for threshold values of 160, 170, 180, 190, 200, 210, 220 and 240, respectively, are depicted in FIGS. 16a, 16b, 16c, 16d, 16e, 16f, 16g and 16h, respectively.

Figure 17:
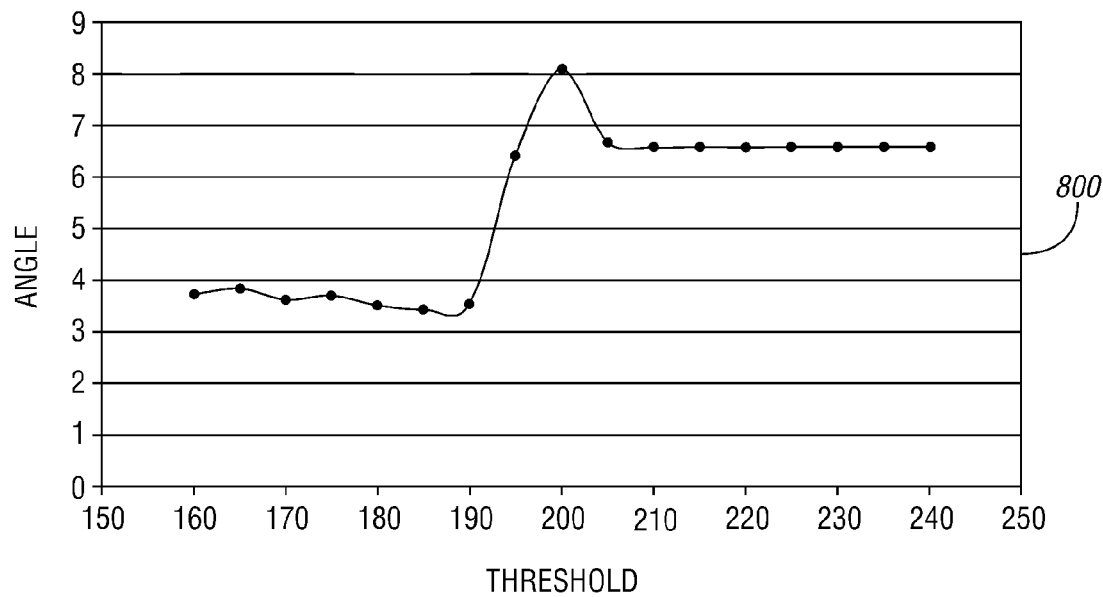
FIG. 17 depicts a graph plotting centroid angles versus threshold values according to an embodiment of the present invention.

The centroid angle of each largest component threshold image is calculated using the description set forth above for block 116. FIG. 17 depicts a graph 800 plotting the centroid angle for each largest component threshold image versus the threshold value based on image 700. As shown in FIG. 17, the centroid angle converges to a position of 6.5 degrees at a threshold value of 210.

Figure 18:
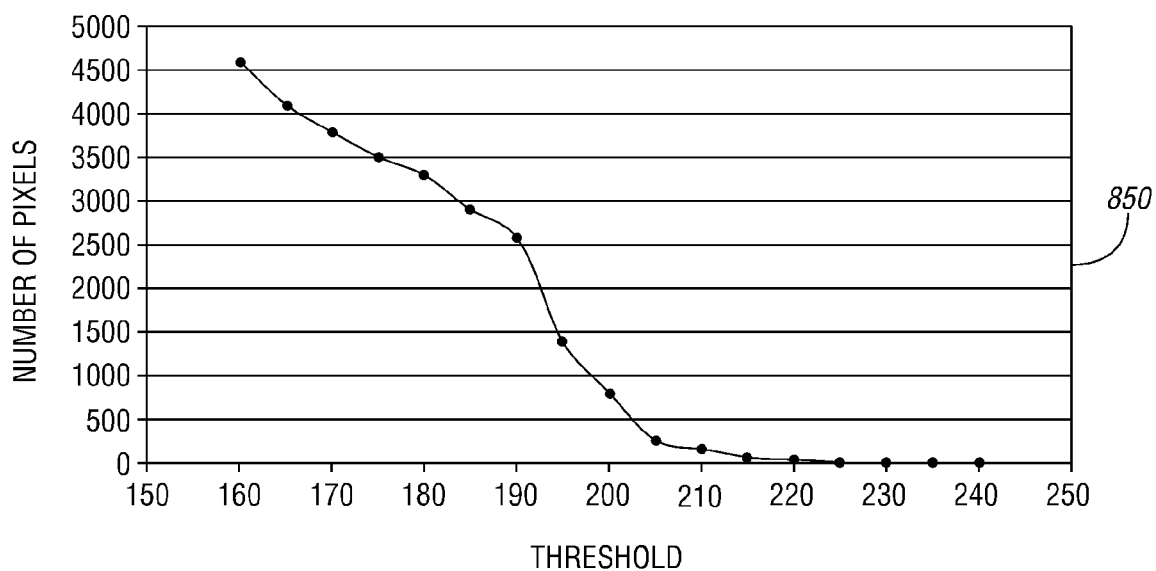
FIG. 18 depicts a graph plotting largest component threshold image pixel values versus threshold values according to an embodiment of the present invention.

The number of pixels in each of the largest component threshold images is compared to the threshold value using the description set forth above for block 118. FIG. 18 depicts a graph 850 plotting the number of pixels in each of the largest component threshold images is compared to the threshold value based on image 700. Curve 852 of graph 850 includes a constant portion 456 within a substantial portion of the threshold boundary of 210 to 240.

Turning back to FIG. 1, the detection system 10 may include vision sensor 18 and/or radar sensor 20 in addition to far IR camera 12. By combining the far IR camera with either of the vision sensor and/or radar sensor, the overall false alarm rate (FAR) of the detection system 10 may be decreased relative to a detection system that includes only a far IR camera because the false alarm failure mode of the far IR camera is substantially independent of the failure mode of vision or radar sensing. For example, if a vision sensor has a FAR of 1% and the far IR system has a FAR of 1%, the combined system has a FAR of 0.01×0.01, or 0.001, or 1 in 10,000.

As required, detailed embodiments of the present invention are disclosed herein. However, it is to be understood that the disclosed embodiments are merely exemplary of the invention that may be embodied in various and alternative forms. Therefore, specific functional details described herein are not to be interpreted as limiting, but merely as a representative basis for the claims and/or as a representative basis for teaching one of ordinary skill in the art to variously employ the present invention.

While the best mode for carrying out the invention has been described in detail, those familiar with the art to which this invention relates will recognize various alternative designs and embodiments for practicing the invention as defined by the following claims.

What is claimed is:

1. An object detection system, the system comprising:
   a far IR sensor operable to sense thermal radiation of objects and surroundings in a field of view and to generate a far IR image in response thereto; and
   an image processing device operable to receive and process the far IR image, the image processing device is-configured to:
      process the far IR image by generating an initial threshold image based on the far IR image and an initial threshold value;
      iteratively obtain a number of successive threshold images based on the far IR image and a number of successively increased threshold values, each increase resulting in an image whose pixels represent objects having higher temperatures; and
      obtain a number of largest component threshold images based on the number of successive threshold images and the number of successively increased threshold values;
      for each of the number of successively increased threshold values, calculate a centroid angle within the field of view from the number of largest component threshold images to obtain a number of centroid angle values;

calculate a plurality of centroid values based on the number of centroid angle values and the number of successively increased threshold values;

calculate a plurality of distances between the plurality of centroid values;

determine a centroid convergence condition as defined by the plurality of distances between the plurality of centroid values, wherein a plurality of distances below a common distance value for successive centroid values signal a convergence by approaching and maintaining a relatively consistent distance as the threshold approaches a maximum; and determine the presence or absence of an object in the field of view based on the initial threshold image, the number of successive threshold images, the initial threshold value, the successive threshold values, and the centroid convergence condition.

2. The object detection system of claim 1, wherein the image processing device is further configured to perform connected component analysis on each of the initial threshold image and the number of threshold images to obtain the number of largest component threshold images.

3. The object detection system of claim 1, wherein the image processing device is further configured to:
determine a centroid angle convergence position if the centroid convergence condition is satisfied; and
determine the presence or absence of the object in the field of view based on the initial threshold image, the number of successive threshold images, the initial threshold value, the successive threshold values, and the centroid convergence position.

4. The object detection system of claim 3, wherein whether the centroid convergence condition is satisfied is based on the plurality of distances between at least three centroid values.

5. The object detection system of claim 1, wherein the image processing device is further configured to determine the largest component pixel value count for each of the largest component threshold images.

6. The object detection system of claim 5, wherein the image processing device is further configured to determine the presence of a consistency condition defined as a consistent pixel count for the largest component threshold images as a function of the successively increased threshold values by analyzing the largest component pixel count for each of the largest component threshold images as a function of the initial threshold value and the successively incremented threshold values.

7. The object detection system of claim 6, wherein the image processing device is further configured to determine the presence or absence of the one or more objects based on the centroid convergence condition and the consistency condition being satisfied.

8. The object detection system of claim 1, wherein the far IR sensor is a 80×60 far IR camera.

9. The object detection system of claim 1, wherein the pixel dimensions of the far IR image are 60×20.

10. The object detection system of claim 1, wherein the one or more detected objects is a thermal object of interest.

11. The object detection system of claim 1, wherein the one or more detected objects is a pedestrian or an animal.

12. The object detection system of claim 1, wherein the far IR sensor is configured to generate a gray scale image.

13. A method of detecting an object, the method comprising:
receiving a far IR image generated by a far IR sensor operable to sense thermal radiation of objects and surroundings in a field of view;
processing the far IR image by generating an initial threshold image based on the far IR image and an initial IR sensitivity threshold value, iteratively obtaining a number of successive threshold images based on the far IR image and a number of successively increased threshold values, each increase resulting in an image whose pixels represent objects having higher temperatures;
obtaining a number of largest component threshold images based on the number of successive threshold images and the number of successively increased threshold values;
for each of the number of successively increased threshold values, calculating a centroid angle within the field of view from the number of largest component threshold images to obtain a number of centroid angle values;
calculating a plurality of centroid values based on the number of centroid angle values and the number of successively increased threshold values;
calculating a plurality of distances between the plurality of centroid values;
determining a centroid convergence condition as defined by the plurality of distances between the plurality of centroid values, wherein a plurality of distances below a common distance value for successive centroid values signal a convergence by approaching and maintaining a relatively consistent distance as the threshold approaches a maximum; and
determining the presence or absence of an one or more objects in the field of view based on the initial threshold image, the number of successive threshold images, the initial threshold value, and the successive threshold values, and the centroid convergence condition.

14. The method of claim 13, further comprising performing connected component analysis on each of the initial threshold image and the number of threshold images to obtain the number of largest component threshold images.

15. The method of claim 13, further comprising:
determining a centroid angle convergence position if the centroid convergence condition is satisfied; and
determining the presence or absence of the object in the field of view based on the initial threshold image, the number of successive threshold images, the initial threshold value, the successive threshold values, and the centroid convergence position.

16. The method of claim 13, wherein whether the centroid convergence condition is satisfied is based on the plurality of distances between at least three centroid values.

17. The method of claim 13, further comprising determining the largest component pixel count for each of the largest component threshold values.

18. The method of claim 17, further comprising determining the presence of a consistency condition defined as a consistent pixel count for the largest component threshold images as a function of the successively increased threshold values by analyzing the largest component pixel count for each of the largest component threshold images as a function of the initial threshold value and the successively incremented threshold values.

19. The method of claim 18, further comprising determining the presence or absence of the object based on the centroid convergence condition and the consistency condition being satisfied.

20. An object detection system, the system comprising:
a far IR sensor operable to sense thermal radiation of objects and surroundings in a field of view and to generate a far IR image in response thereto;
a secondary sensor selected from the group consisting of a vision sensor operable to sense objects and surroundings in the field of view and to generate a vision sensor image in response thereto, and a laser sensor operable to sense objects and surroundings in the field of view and to generate a laser sensor image in response thereto; and
a processing device operable to receive and process the far IR image and the vision sensor image or the laser sensor image to detect the presence or absence of an object in the field of view, the image processing device is configured to:
process the far IR image by generating an initial threshold image based on the far IR image and an initial threshold value;
iteratively obtaining a number of successive threshold images based on the far IR image and a number of successively increased threshold values, each increase resulting in an image whose pixels represent objects having higher temperatures;
perform a comparison of a pixel count of each of the largest component threshold images to the successively increased threshold values;
determine the largest component pixel count for each of the largest component threshold images based on the comparison;
for the largest component threshold images, determine a presence of a consistency condition, including at least a plurality of image centroids having distances below a common distance value for successive iterations of increased threshold values, signaling a convergence by approaching and maintaining a relatively consistent distance as the threshold approaches a maximum, defining consistent largest component pixel counts of the images as a function of the successively increased threshold values; and
determine the presence or absence of the objects in the field of view based on the initial threshold image, the number of successive threshold images, the initial threshold value, the successive threshold values, and the consistency condition.

21. The object detection system of claim 20 wherein the image processing device is further configured to:
if the consistency condition is satisfied, determine a threshold value boundary defining a position of the consistent largest component pixel values; and
determine the presence or absence of the object in the field of view based on the initial threshold image, the number of successive threshold images, the initial threshold value, the successive threshold values, and the threshold value boundary.

22. The object detection system of claim 1 wherein the image processing device is further configured to:
for each image having a centroid, determine a distance between the centroids of each image; and
determine if the centroid angle convergence condition is satisfied based on the distance between the centroids.

* * * * *